United States Patent
Herlet et al.

(10) Patent No.: US 7,365,460 B2
(45) Date of Patent: Apr. 29, 2008

(54) STATOR FOR AN ELECTRICAL MACHINE

(75) Inventors: Werner Herlet, Bad Bocklet (DE); Hubertus Büttner, Bad Kissingen (DE); Michael Fister, Poppenhausen-Kützberg (DE); Bernhard Schmitt, Waserlosen (DE); Marcus van Heyden, Dittelbrunn (DE); Alfons Vollmuth, Dittelbrunn-Hambach (DE); Manfred Röder, Schweinfurt (DE); Khalid Jafoui, Trunstadt (DE); Jens Baumeister, Poppenhausen (DE); Knut Welke, Falkensee/Waldheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/377,748

(22) Filed: Mar. 16, 2006

(65) Prior Publication Data
US 2006/0208587 A1   Sep. 21, 2006

(30) Foreign Application Priority Data
Mar. 17, 2005   (EP) .................................. 05005797

(51) Int. Cl.
*H02K 11/00* (2006.01)
(52) U.S. Cl. ...................................................... 310/71
(58) Field of Classification Search .................. 310/71, 310/260, 270
See application file for complete search history.

(56) References Cited

U.S. PATENT DOCUMENTS

| | | | | |
|---|---|---|---|---|
| 5,828,147 | A * | 10/1998 | Best et al. ..................... | 310/71 |
| 5,900,687 | A * | 5/1999 | Kondo et al. .................. | 310/71 |
| 6,011,339 | A * | 1/2000 | Kawakami ................... | 310/208 |
| 6,177,741 | B1 * | 1/2001 | Lutkenhaus et al. .......... | 310/71 |
| 6,369,473 | B1 | 4/2002 | Baumeister et al. | |
| 6,600,244 | B2 * | 7/2003 | Okazaki et al. ............... | 310/71 |
| 6,914,356 | B2 * | 7/2005 | Yamamura et al. ........... | 310/71 |
| 6,924,570 | B2 * | 8/2005 | De Filippis et al. .......... | 310/71 |
| 2003/0094879 | A1 | 5/2003 | Kobayashi et al. | |
| 2004/0251752 | A1 | 12/2004 | Shinzaki et al. | |
| 2005/0035680 | A1 | 2/2005 | Murakami et al | |

OTHER PUBLICATIONS

Search Report dated Oct. 6, 2005 issued for corresponding European Application No. EP 05 00 5797.

* cited by examiner

*Primary Examiner*—Dang D. Le
(74) *Attorney, Agent, or Firm*—Cohen Pontani Lieberman & Pavane LLP (57) ABSTRACT

In a plurality of stator coils arranged on the yoke, each coil has a pair of ends, each end being adjacent to a respective end of an adjacent coil to form pairs of adjacent ends. A plurality of mutually insulated concentrically arranged linking conductors each has a plurality of circumferentially arranged terminal elements, each terminal element being electrically connected to a respective pair of adjacent ends to form a contact area in a common axial and radial position.

20 Claims, 7 Drawing Sheets

STATOR FOR AN ELECTRICAL MACHINE

BACKGROUND OF THE INVENTION

1. Field of the Invention

The invention pertains to a stator having a yoke, a plurality of stator coils arranged on the yoke, and a plurality of mutually insulated linking conductors having terminal elements connected to ends of the stator coils.

2. Description of the Related Art

Known stators for electrical machines have a stator yoke with a number of stator teeth, which carry the electrical winding in the form of, for example, individually wound stator coils of insulated wire. The two ends of each coil are assigned to individual strands and are connected to each other in a predetermined manner by common linking conductors. In the case of a three phase machine, the stator has three strands and thus at least three linking conductors, each of which is supplied with current with a phase offset of 120°. The linking conductors are wired to a switch box so that the electrical machine can be connected to a power source.

U.S. Pat. No. 6,369,473 discloses a stator for an electrical machine in which the wiring arrangement has electrically insulated linking conductors, which are concentric with respect to each other. The terminals which accept the ends of the stator coils are in the form of projections extending from the linking conductors. For each coil end, a separate terminal projection is provided, and as a result of the radial staggering of the linking conductors thus realized here, the connecting points are also in different radial positions. The electrical connections can be realized here by a joining technique such as welding or soldering and/or by simply winding the wire around the terminal projection. The linking conductors are supported against each other and against the stator by interposed strips of insulating material.

The wiring technique explained above suffers from the disadvantage that there is a very large number of contact points, each of which must be produced individually, that is, by a separate joining procedure. It should also be remembered that the ends of the coils must be cut individually to the required length beforehand, this length depending on the radial position of the linking conductor. Overall, wiring work of this type is very time-consuming and thus cost-intensive. Because of the relatively large number of coil ends, furthermore, there is considerable danger of connecting them incorrectly when the stator coils are being connected, that is, of assigning them incorrectly to their intended linking conductors. Even if great care is taken, it is still impossible to be completely certain that all of the connections are made properly during the production of these stators.

SUMMARY OF THE INVENTION

An object of the present invention is to simplify the wiring arrangement of the stator, in particular so that the individual processes involved in connecting the wiring can be accomplished reliably and can be performed by automated equipment.

According to the invention, the contact areas of the ends of the coils are arranged in a common axial and radial position with the wiring arrangement. As a result, the contacting can be carried out automatically by a stationary tool while the stator is supported with freedom to rotate around a center axis, without the need for any additional radial feed movements. A considerable increase in productivity can be achieved when the end of one coil and the circumferentially adjacent end of a second coil are assigned to one and the same linking conductor by means of a common terminal element. This means that, per joining operation, two coil ends are connected simultaneously, as a result of which a considerable amount of time and money is saved in the production of a stator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

FIGS. 1-4 show a first exemplary embodiment, and FIGS. 5-9 show a second embodiment of a stator 10 with a wiring arrangement 16'. The design of the stator winding is identical in both cases. The only differences pertain to the design of the wiring arrangement.

Figure 1:
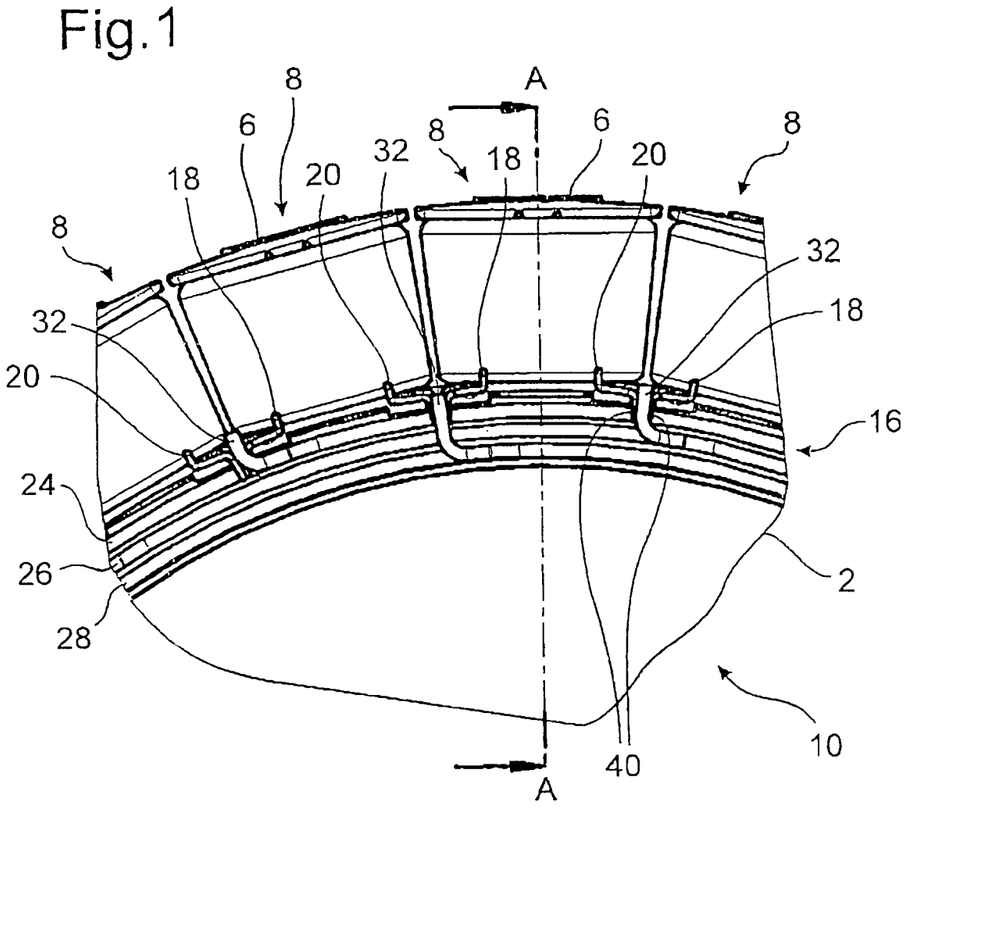
FIG. 1 shows part of a stator according to the invention equipped with individual coils and with a wiring arrangement located radially on the inside.
Figure 2:
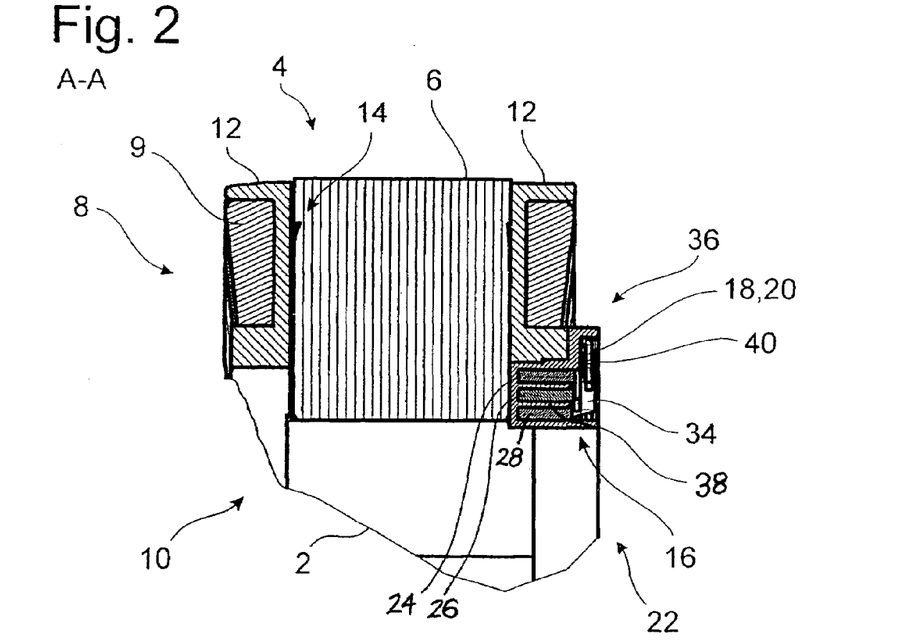
FIG. 2 shows an axial cross section along line A-A of the stator shown in FIG. 1.

FIGS. 1 and 2 show part of a stator 10, mounted on a cooled hub 2, for an electrical machine (not shown). The stator has a ring-shaped stator yoke 4 consisting of laminations of electrical steel. This is the stator of a synchronous electrical machine of the external rotor type excited by permanent magnets. The special design of the electrical machine is irrelevant to the following explanation, however; the machine could be, for example, an induction motor, a reluctance machine of the internal, external, or disk rotor type, or any other type of electrical machine. The stator yoke 4 has a number of radially outward-oriented teeth 6 arranged around the circumference. Each tooth 6 carries an individual coil 8. The coils 8 consist of windings 9 of a single or multi-strand conductor. The individual conductors can be twisted around each other.

In FIGS. 1 and 2, each individual coil 8 is first wound separately in a preceding production step on two winding bodies 12, consisting of insulating material, and then pushed onto a tooth 6 of the stator yoke 4, where it is secured against slipping by a latching connection 14. Each coil 8 has two ends 18, 20, which extend out from the coil 8 in the radially inward direction and are available at a common end surface 22 of the stator 10 for connection. The coils 8 are assigned to individual strands and, as will be explained in greater detail below, are wired together in a predetermined manner by the use of common linking conductors 24, 26, 28. The linking conductors 24, 26, 28 are arranged coaxially on the stator 10; in the present case, therefore, they are offset radially from each other. To save space they are radially adjacent to the coils 8 and on the same axial level as the coils.

Figure 3:
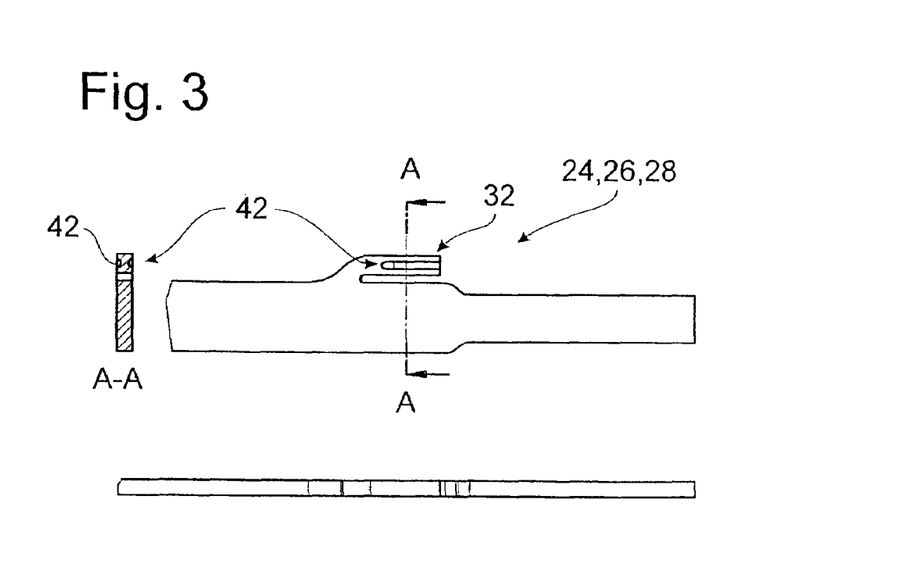
FIG. 3 shows a partial view of a linking conductor with lateral terminal elements, to which the ends of the coils are connected.
Figure 4:
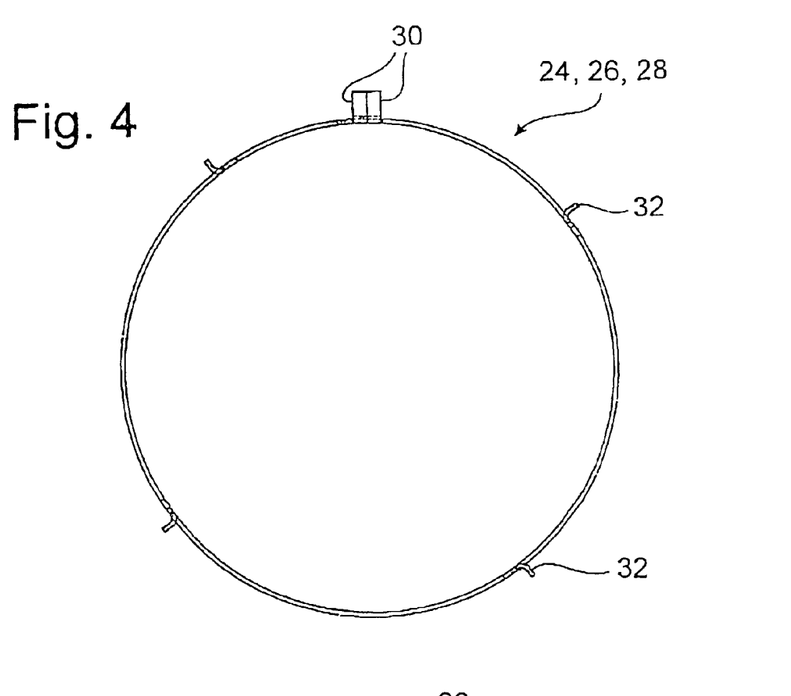
FIG. 4 shows a linking conductor according to FIG. 3, bent into a circle.

As shown in FIG. 3, the linking conductors 24, 26, 28 are designed as conducting strips of copper, for example, which are bent into rings. As shown in FIG. 4, extended end sections 30 project from the ring, so that the electrical machine can be connected to a power supply device.

Several circumferentially distributed terminal elements 32 are used to connect the conductors to the coil ends 18, 20. On each linking conductor 24, 26, 28, these terminal elements are all originally offset axially from the strip by the same amount, thus flanking the strip and paralleling it, and then they are bent in the radial direction so that they can be connected to the stator 10 (FIG. 4). So that all of the areas where the coil ends 18, 20 contact the terminal elements 32 can be in a common radial position, the lengths of the terminal elements 32 on the linking conductors 24, 26, 28 will be different. Of course, the terminal elements 32 can first project at a right angle or some other angle from the plane of the strips forming the linking conductors 24, 26, 28 and then be oriented radially as appropriate.

The terminal elements 32 have a uniform circumferential spacing, each terminal element being located on a radius extending between adjacent said stator coils.

In the assembled state position shown in FIGS. 1 and 2, the linking conductors 24, 26, 28 are arranged inside a receiving space 34 of a support structure 36 on the stator 10. The support structure 36 is made as a separate plastic ring with a receiving space 34, which is in the form of a groove open on one side. It can also be seen that the support structure 36 rests by one of its end surfaces against the laminated core 4 and is located radially between the stator hub 2 and the winding bodies 12. The support structure 36 is held firmly in place by a snap-in connection (not shown) between the support structure and the winding bodies 12. The receiving space 34 is of such a size that both the base structure and the terminal elements of the linking conductors 24, 26, 28 projecting from it can be accommodated inside it. So that the linking conductors 24, 26, 28 can be insulated from each other, two insulating webs 38 are provided in the receiving space. These webs are easy to integrate into the receiving space by the use of suitable manufacturing techniques such as injection-molding.

It can be seen in FIG. 1 that the radially oriented terminal elements 32 are arranged on the circumference of the stator so each element lies between the end 18 of one coil 8 and the adjacent end 20 of a second coil 8. Each terminal element 32 is electrically connected to these two ends. For this purpose, the support structure 36 has openings through which the coil ends 18, 20 can be introduced, where the contact areas 40 of the linking conductors 24, 26, 28 with the coil ends 18, 20 are formed inside the receiving space 34. Thus two ends 18, 20 adjacent to each other on the circumference, one end belonging to one coil 8, the other end to a second coil, are assigned to one and the same linking conductor 24, 26, 28 by means of a common terminal element 32. As a result, all of the contact areas 40 of the coil ends 18, 20 with the wiring arrangement 16 are arranged in a common axial and radial position, (i.e., all of the contact areas 40 are in a common plane and on a common circle), from which the advantage arises that the two coil ends 18, 20 assigned to one terminal element 32 can be electrically connected simultaneously, in a single step, to the terminal element to form two contact areas 40.

In FIG. 1, the terminal elements 32 are located centrally between the two coil ends 18, 20. It can also be effective to position the terminal elements 32 as close as possible to one of the coil ends 18, 20 and to hold the other coil end 18, 20, which will thus have to be somewhat longer, in place in the circumferential direction in a channel, for example, in the winding body 12 or in the support structure 36. Thus mechanically stabilized, this longer end 18, 20 can then be led up to the terminal element 32.

When the contact areas 40 are produced by soldering or welding, for example, it is advantageous to provide the terminal elements 32 with impressed grooves 42 corresponding to the contour of the conductor, because this guarantees the largest possible contact area. When round coil wires are used, for example, the contact area 40 would be semicircular, as shown in cross section in FIG. 3. The grooves 42 are impressed in opposite surfaces of a single thickness of the sheet metal (FIG. 3), and face opposite circumferential directions (FIG. 1).

To protect the linking conductors 24, 26, 28 and the contact areas 40 from corrosion and to increase the strength of the wiring arrangement 16, the receiving space 34 can be completely filled with a sealant, so that the linking conductors 24, 26, 28 and the contact areas 40 are completely encapsulated and thus protected from the environment.

As an alternative to the support structure 36 manufactured as a separate ring, the structure can also be made up of individual segments. For example, appropriate structures can be formed on the radially inward or radially outward side of the winding bodies 12, so that, after all of the coils 8 have been mounted on the stator 10, the individual structures form a closed ring, on which linking conductors 24, 26, 28 can be mounted.

Figure 5:
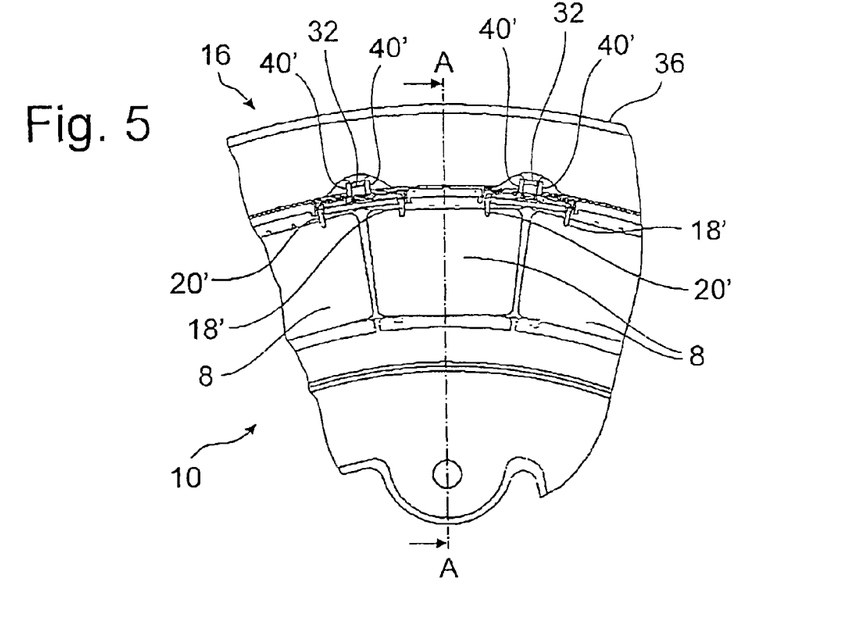
FIG. 5 shows part of a second embodiment of stator according to the invention equipped with individual coils and a wiring arrangement located radially on the outside.
Figure 6:
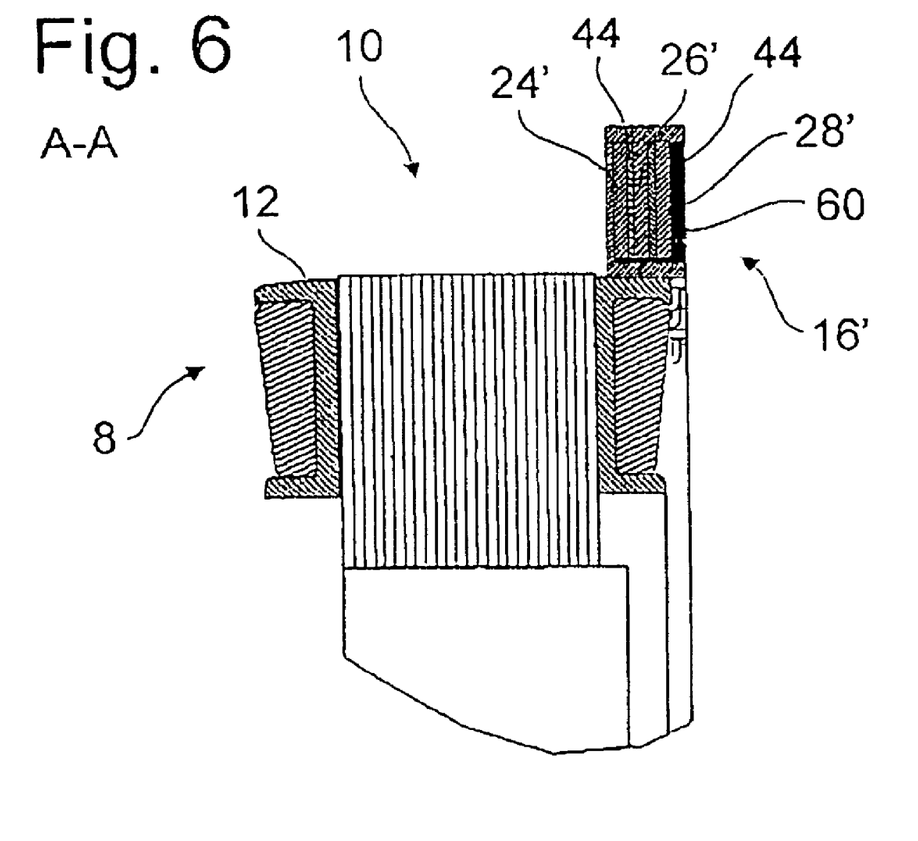
FIG. 6 shows an axial cross section along line A-A of the stator shown in FIG. 5.
Figure 7:
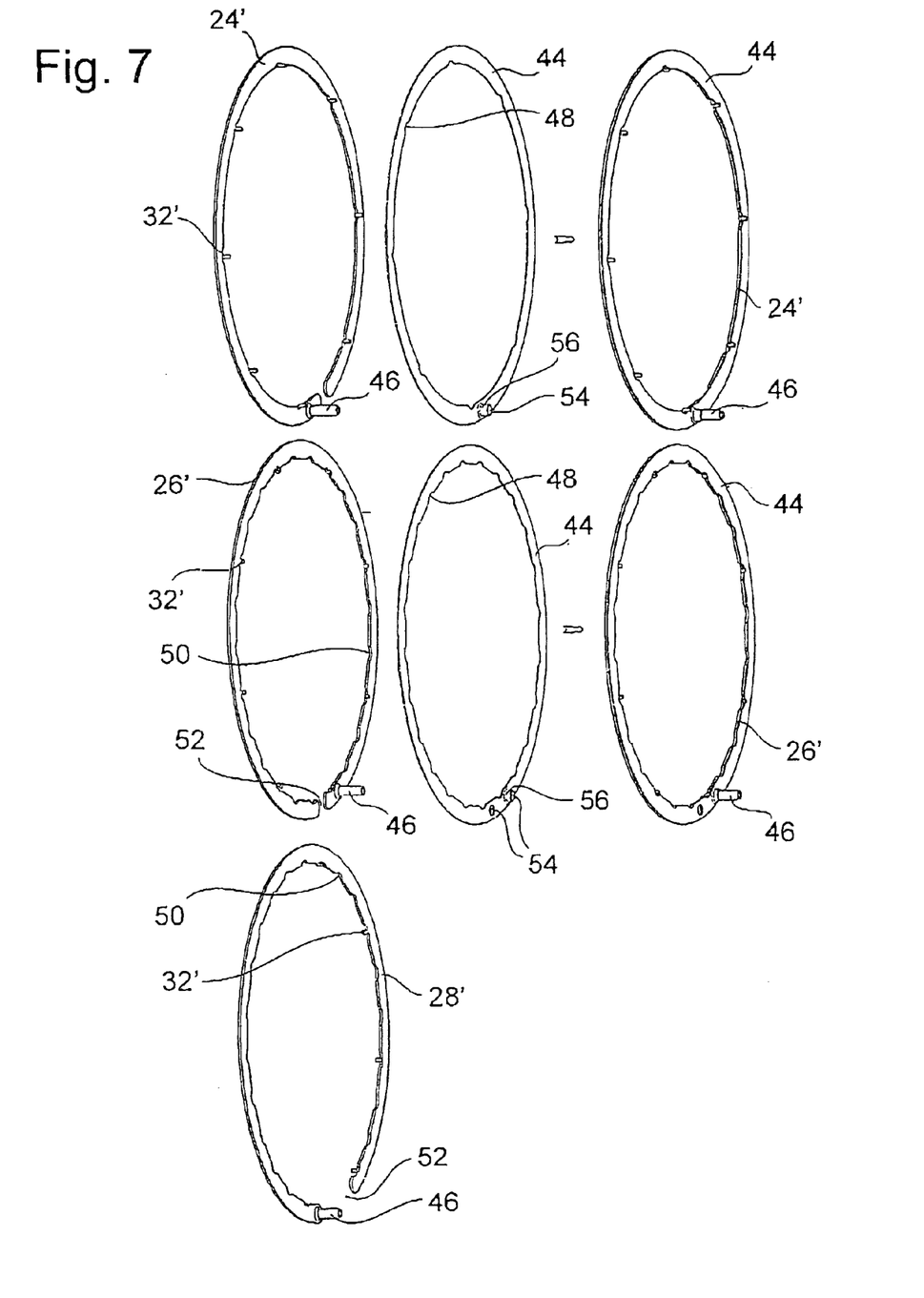
FIG. 7 shows a perspective view of elements of an axially staggered wiring arrangement.

FIGS. 5-9 show by way of example how a wiring arrangement 16' on a stator 10 can be designed with axial staggering of the individual linking conductors 24', 26', 28', between which insulating disks 44 are placed. As shown in FIGS. 5 and 6, at the stator 10 the linking conductors are mounted radially above the coils 8 by a latching type of connection with the winding bodies 12. Strip conductors can be used for this purpose, as in the previously explained example. Here they are converted into a circular form by rolling on edge to form an open ring structure (FIG. 7). Each of the linking conductors 24', 26', 28' carries terminal elements 32' on its inside edge. These elements are bent over in the axial direction so that they can be connected to the coil ends 18', 20'. So that the stator 10 can be connected to a power supply device, each linking conductor also has a projecting terminal pin 46. The terminal elements 32' on the linking conductors 24', 26', 28' originally point radially inward and are then bent over axially at an angle, so that they ultimately arrive within the area of the radial extension of the linking conductors 24', 26', 28'. Because the terminal elements 32' of the individual linking conductors 24', 26', 28' overlap each other at least partially in the axial direction, recesses 48 are formed in the insulating disks 44 and recesses 50 are formed in the adjacent linking conductors 26', 28'. As can be seen in the perspective view of FIG. 7, the terminal elements 32' and the terminal pin 46 are formed on the same end surface in the case of the linking conductors 24' and 26'. In the case of the linking conductor 28', however, these components are on opposite end surfaces. Note that the two right-hand rings in FIG. 7 depict subassemblies 24', 44 and 26', 44. In the assembled state shown in FIG. 8, all of the terminal pins 46 therefore point in the same direction, and the terminal elements 32' and the contact areas where they are connected to the coil ends 18', 20' are accommodated essentially in the area axially inside the linking conductors 24', 26', 28'. As a result, the overall design of the wiring arrangement 16' becomes very compact in the axial direction.

Figure 8:
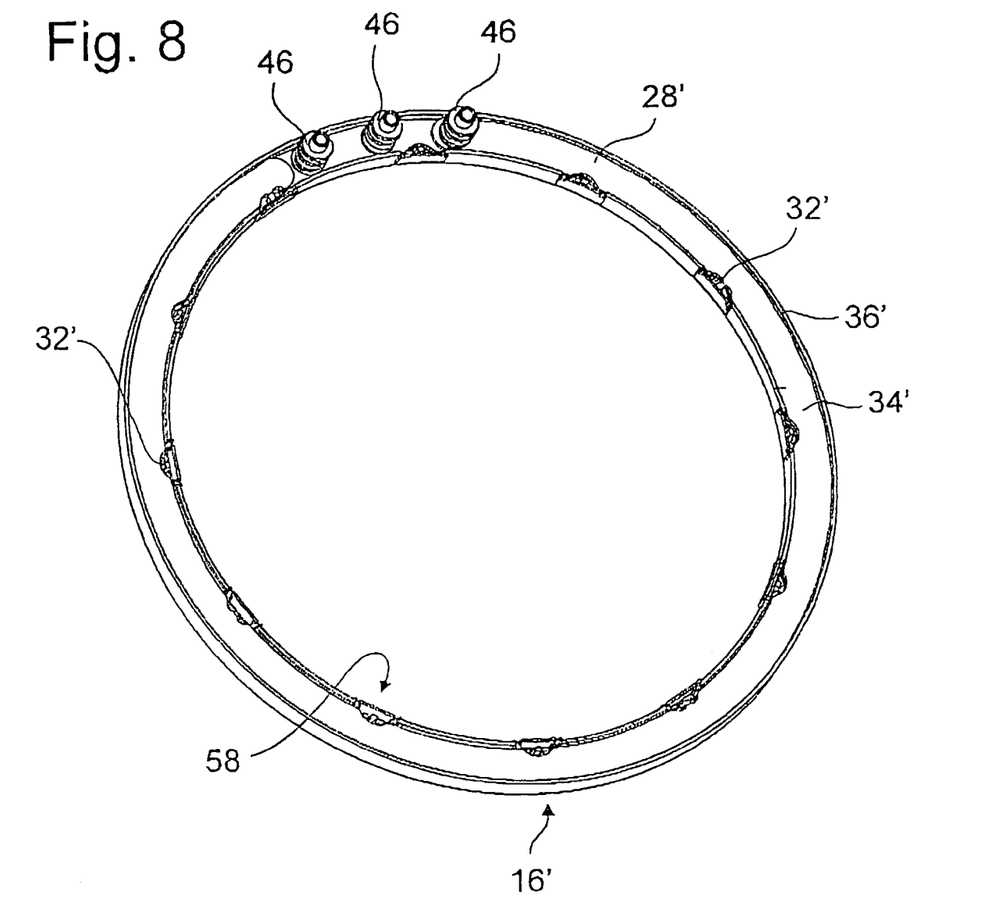
FIG. 8 shows a perspective view of an assembly of a wiring arrangement according to FIG. 7.
Figure 9:
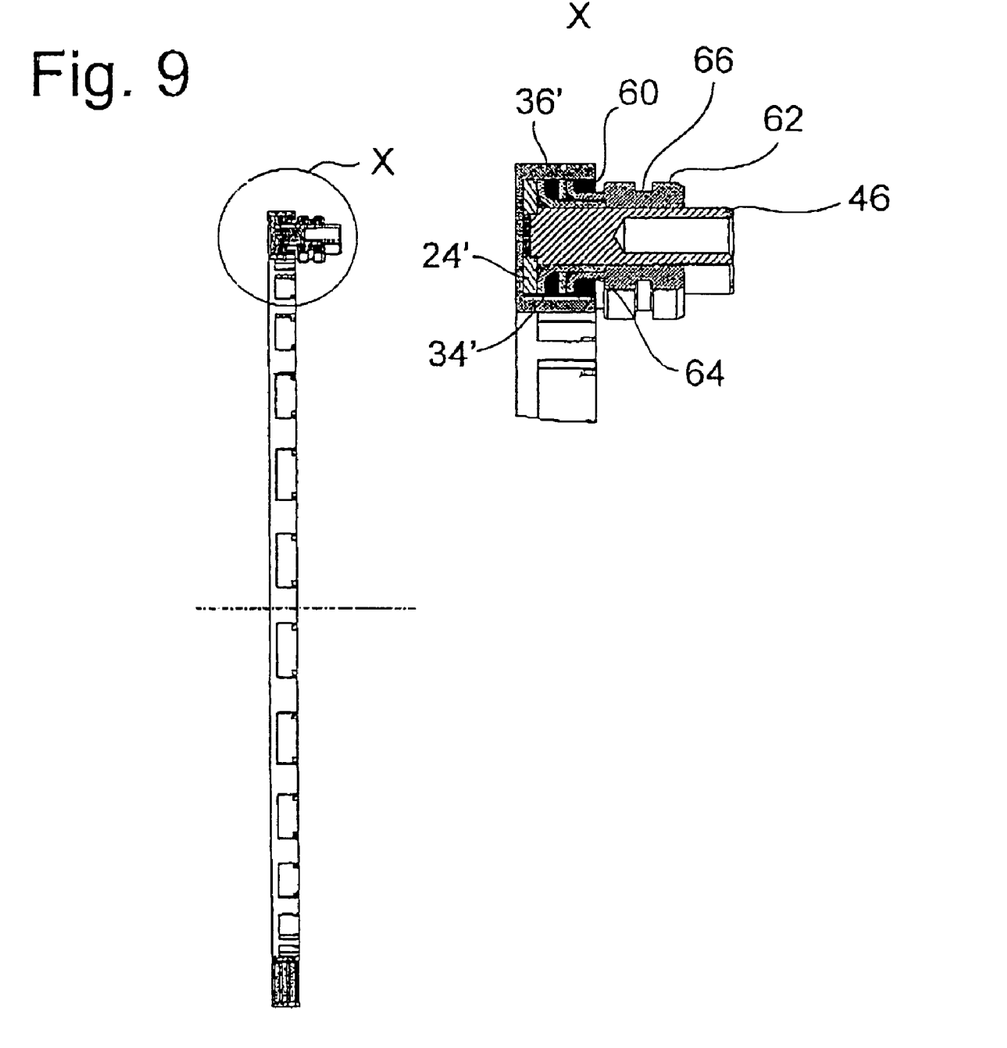
FIG. 9 shows a cross-sectional view of the wiring arrangement according to FIG. 7 with a terminal pin for connecting to a power source.

In the assembled state, the axially projecting terminal pins 46 are offset in the circumferential direction and pass through the free spaces 52 of the linking conductors 26', 28' and through the openings 54 in the insulating disks 44, which also have axially oriented, ring-shaped collars 56. As already explained in conjunction with the first exemplary embodiment, the linking conductors 24', 26', 28' are held in a support structure 36', which is designed as a separate plastic ring with a receiving space 34' in the form of a channel open on one axial side. Pocket-like expansions 58 are provided in the radially inner circumference, near the terminal elements 32', to increase the freedom with which contact can be established with the coil ends 18', 20'.

The terminal pins 46 are soldered to the linking conductors; that is, these fastening areas are also inside the receiving space 34'. After the linking conductors 24', 26', 28', which are insulated against each other by the insulating disks 44, have been introduced into the ring-shaped groove 34' of the support structure 36', the latter is, as shown in FIG. 5, mounted on the stator 10 in such a way that each of the terminal elements 32' lies between two adjacent coils 8. Thus one end 18' of a coil 8 and the adjacent end 20' of a second coil can be connected by a common terminal element 32' to one and the same linking conductor 24', 26', 28' by the use of, for example, an automated contact-welding process.

After the electrical contact areas have been produced as described above, the wiring arrangement 16' can be sealed by a sealant 60, such as a resin or silicone (FIG. 6). So that the stator 10 can be installed in a housing in a fluid-tight manner, the terminal pins 46 can be provided with bushings 62, mounted tightly on them. Each bushing has a ring-shaped collar 64, which rests against the inside surface of the receiving space and is sealed there by the use of the sealant 60. Each bushing 62 also has a ring-shaped groove 66 to accept a ring seal, which fits into an opening in the housing to form a sealed joint.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A stator for an electrical machine, the stator comprising:
   a yoke;
   a plurality of stator coils arranged on the yoke, each coil having a pair of spaced apart ends, each said end being adjacent to a respective said end of an adjacent said coil to form a pair of adjacent ends; and
   a plurality of mutually insulated linking conductors arranged concentrically with respect to each other, each linking conductor having a plurality of circumferentially arranged terminal elements, each terminal element being electrically connected to a respective pair of adjacent ends to form contact areas, wherein the contact areas of the ends of all of said coils are arranged in a common plane and on a common circle.

2. The stator of claim 1 wherein each said terminal element lies circumferentially between a respective said pair of adjacent ends.

3. The stator of claim 1 further comprising a support structure mounted on the yoke, the support structure having a receiving space in which the linking conductors are mounted.

4. The stator of claim 3 wherein said support structure comprises a channel having an axially open side.

5. The stator of claim 3 wherein the contact areas lie in the receiving space.

6. The stator of claim 5 further comprising a sealant sealing said contact areas in said receiving space.

7. The stator of claim 3 further comprising winding bodies on which the coils are wound, the support structure being mounted on the winding bodies.

8. The stator of claim 3 further comprising winding bodies on which the coils are wound, the support structure comprising segments formed integrally with respective winding bodies.

9. The stator of claim 3 wherein each said linking conductor has at least one axially projecting terminal pin for connecting to a power supply.

10. The stator of claim 9 wherein each said terminal pin is fastened to a respective said linking conductor inside said receiving space.

11. The stator of claim 9 further comprising a bushing fitted on each said terminal pin, each said bushing comprising a collar which is sealed by a sealant in said receiving space, and a ring groove which accepts a ring seal, whereby each said terminal pin is fitted into a respective opening in a stator housing to form a sealed joint.

12. The stator of claim 1 wherein said linking conductors are staggered radially, each said linking conductor being a strip conductor having axial sides, each said terminal extending radially from one of said axial sides.

13. The stator of claim 1 wherein said linking conductors are staggered axially, each said linking conductor being a strip conductor having radial sides, each said terminal extending axially from one of said radial sides.

14. The stator of claim 1 wherein each said linking conductor has at least one radially projecting end section for connecting to a power supply.

15. The stator of claim 1 wherein said terminal elements are formed integrally with said linking conductors.

16. The stator of claim 1 wherein each said terminal element has a pair of impressed grooves, each groove having a contour which conforms to one of said coil ends.

17. The stator of claim 16 wherein the grooves of each said terminal element face in opposite circumferential directions.

18. The stator of claim 17 wherein each said linking conductor is stamped from sheet metal, said grooves being impressed in opposite surfaces of a single thickness of said sheet metal.

19. The stator of claim 1 wherein the terminal elements of each said linking conductor have a uniform circumferential spacing.

20. The stator of claim 1 wherein the terminal elements have a uniform circumferential spacing and are located on respective radii extending between adjacent said stator coils.

* * * * *